United States Patent [19]

Warnecke et al.

[11] Patent Number: 4,516,470
[45] Date of Patent: May 14, 1985

[54] UNBALANCED HYDRAULIC AMPLIFIER VALVE ASSEMBLY

[75] Inventors: Rolf Warnecke, Gifhorn; Heinz Rühmer, Wolfenbüttel; Günter Leineweber, Gifhorn, all of Fed. Rep. of Germany

[73] Assignee: Volkswagenwerk AG, Wolfsburg, Fed. Rep. of Germany

[21] Appl. No.: 274,446

[22] Filed: Jun. 17, 1981

[30] Foreign Application Priority Data

Jun. 20, 1980 [DE] Fed. Rep. of Germany ....... 3023027

[51] Int. Cl.$^3$ .............................................. F15B 7/00
[52] U.S. Cl. ......................................... 91/374; 91/378
[58] Field of Search .................. 91/374, 378, 376 R, 91/422; 251/193, 175; 92/127; 277/27, 3

[56] References Cited

U.S. PATENT DOCUMENTS

| | | | |
|---|---|---|---|
| 1,105,209 | 3/1913 | Sauchereau | 251/193 |
| 1,707,125 | 3/1929 | Löffler | 251/193 |
| 2,792,019 | 5/1957 | Lieser | 251/175 X |
| 3,354,788 | 11/1967 | Garrison | 91/378 |
| 3,532,027 | 10/1969 | MacDuff | 91/378 |
| 3,899,890 | 8/1975 | Adams | 91/378 X |

FOREIGN PATENT DOCUMENTS

2602050  2/1979  Fed. Rep. of Germany .

OTHER PUBLICATIONS

Automobiltechnische Zeitschrift, 75, (1973)7, pp. 261-263.

Primary Examiner—Robert E. Garrett
Assistant Examiner—John M. Husar
Attorney, Agent, or Firm—Spencer & Frank

[57] ABSTRACT

An unbalanced hydraulic valve assembly includes a first plunger element slidably and transversely displaceably received in a second plunger element wth a loose fit; a work chamber; a pressure supply conduit provided in the valve assembly for introducing pressurized hydraulic fluid thereinto; a control port arrangement in one of the plunger elements in an asymmetrical relationship relative to the circumference of the plunger elements. The control port arrangement permits or blocks flow from the pressure supply conduit to the work chamber dependent upon the relative axial position between the plunger elements. A force transmitting member is supported in the second plunger element for displacement transversely to the direction of relative axial motion between the plunger elements. The force transmitting member engages the first plunger element and is exposed to pressurized hydraulic fluid for pressing the first plunger element against an inner wall face of the axial bore provided in the second plunger element. The first plunger element and the second plunger element are free from annular seals between themselves.

12 Claims, 1 Drawing Figure

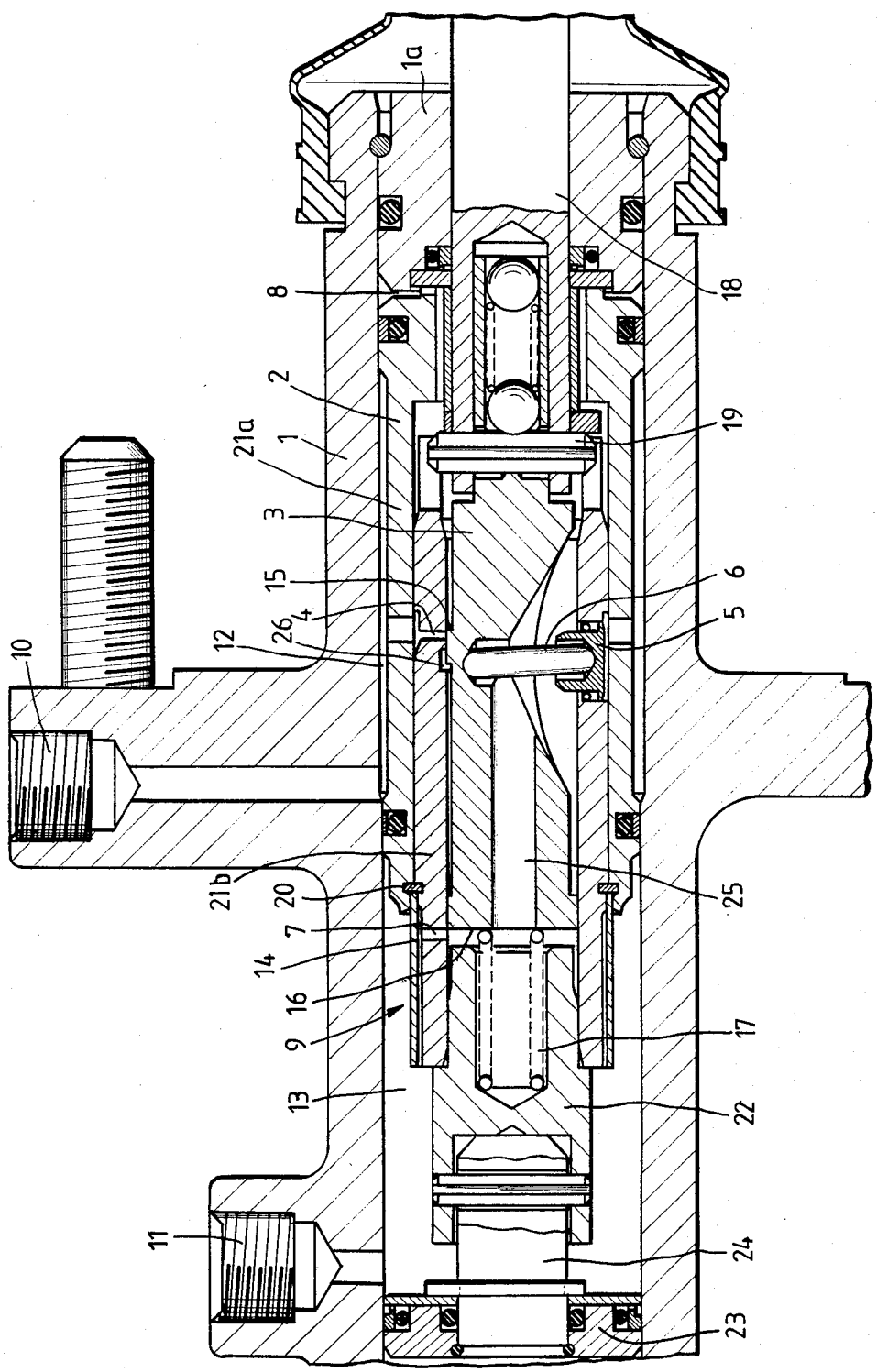

UNBALANCED HYDRAULIC AMPLIFIER VALVE ASSEMBLY

BACKGROUND OF THE INVENTION

This invention relates to an unbalanced hydraulic valve assembly (that is, it comprises a valve which is not pressure-equalized) including a first plunger element axially slidably held in an axial bore of a second plunger element and further, by means of a control port which is asymmetric relative to the circumference of the plunger elements, the flow of hydraulic liquid from a pressure source (generating the system pressure) to a work chamber is permitted or is blocked, dependent upon the relative position of the plunger elements. The first plunger element, because of its loose fit within the second plunger element, is radially displaceable to an extent which is, however, very small relative to its axial displacement.

A valve assembly of the above-outlined known type, disclosed, for example, in German Accepted Published Patent Application (Auslegeschrift) No. 2,602,050, may be of a hydraulic amplifier valve assembly and may find application particularly for a hydraulic brake system of an automotive vehicle.

The manufacture of conventional hydraulic valves, particularly hydraulic amplifier valve assemblies which include two plunger elements arranged for relative axial sliding motion within one another is relatively complex. By virtue of the symmetrical arrangement of the control ports relative to the circumference of the plunger elements, the conventional hydraulic valve is a balanced (that is, pressure-equalized) unit in which the plunger elements fit into one another with high precision in order to ensure, on the one hand, an easy axial displacement of one plunger element relative to the other and, on the other hand, to prevent leakage of the hydraulic fluid. For preventing leakages which, for example, cause a pressure drop in the hydraulic pressure accumulators cooperating with the valve assembly, it is known (as disclosed, for example, in the periodical Automobiltechnische Zeitschrift, 75 (1973) issue 7, on pages 261, 262 and in FIG. 2a) to provide in the path of the pressure supply conduit leading to the hydraulic valve, an additional pre-selection valve within the valve housing. During idle periods of the hydraulic valve, the pre-selection valve separates the hydraulic valve from the pressure source, but upon actuation of the hydraulic valve, the pre-selection valve establishes communication between the hydraulic valve and the pressure source by displacement of a pre-selection valve pin by cam action.

In order to reduce the construction costs, particularly with regard to the necessary precision of fit between the two relatively slidable plunger elements, without, however, adversely affecting their control or amplifying functions, the plunger elements which are arranged within one another for relative axial displacement, that is, the outer amplifier piston and the inner control plunger of a known hydraulic amplifier valve assembly are designed as an unbalanced unit, as disclosed, for example, in German Accepted Published Patent Application (Auslegeschrift) No. 2,602,050. The control plunger described therein is arranged within the amplifier piston with an intentionally loose fit so that the control plunger may execute radial motions which are, however, very small relative to its possible axial displacements. The control ports are asymmetrically arranged in relation to the circumference of the control plunger or the amplifier piston. The imbalance resulting from the radial displaceability and the asymmetrical arrangement of the control ports provides that during operation, dependent upon the position of the control plunger in relation to the amplifier piston, in the zone of the one or the other control port there are obtained, along the circumference of the control plunger, pressure differences which displace the control plunger in the zone of the respective control port radially against the inner wall of the amplifier piston bore. As a result, the control port, despite the loose fits, is closed with a highly effective seal.

In the above-outlined unbalanced hydraulic amplifier valve assembly annular seals are arranged on both sides of the pressure control port, at a certain axial distance therefrom. The effect of the annular seals is, among others, that at the height of the control port then closed, pressure may build up along the circumference of the control plunger in a manner discussed before; such a pressure causes a radial displacement of the control plunger.

Unbalanced hydraulic control plungers of the above-outlined type have been operating satisfactorily in practice and have the significant advantage that they may be manufactured with relatively loose fits. It is, however, a disadvantage of this known valve structure that the annular seals, because of the necessary frictions to assure a proper sealing effect, prevent an easy relative axial displacement of the plunger elements.

SUMMARY OF THE INVENTION

It is an object of the invention to provide an improved unbalanced hydraulic valve assembly of the above-outlined type in which a smooth, easy displacement of the relatively slidable components is ensured without the necessity of providing closer fits or without adversely affecting the sealing properties.

This object and others to become apparent as the specification progresses, are accomplished by the invention, according to which, briefly stated, the inner plunger element is arranged within the outer plunger element without the use of axial ring seals and in the outer plunger element, in the zone of the control port, a force-transmitting member is provided which, energized by operating pressure, presses the inner plunger element radially against the inner wall of the outer plunger element.

The invention thus provides that the first plunger element which may be a control plunger and which is situated within the second plunger element such as an amplifier piston, is pressed, by utilizing the system pressure generated by the pressure source, positively and mechanically in a radial direction against the inner wall of the surrounding plunger element in such a manner that despite a loose fit between the two plunger elements and despite the absence of annular seals on either side of the control ports, a reliable and highly efficient seal is obtained on either side of the control ports in a closed state thereof.

BRIEF DESCRIPTION OF THE DRAWING

The sole FIGURE is an axial sectional view of a preferred embodiment of the invention.

DESCRIPTION OF THE PREFERRED EMBODIMENT

Turning now to the FIGURE, there is shown an unbalanced hydraulic amplifier valve assembly which incorporates the invention and which may be arranged in a hydraulic brake system of an automotive vehicle for serving as a braking pressure amplifier.

The hydraulic amplifier valve assembly essentially comprises a valve assembly housing 1, an amplifier piston 2 axially slidably supported in a cylindrical axial bore 9 of the valve assembly housing 1 as well as a control plunger 3 which is supported in an axial blind bore 14 provided in the amplifier piston 2. The control plunger 3 may be axially displaced within the amplifier piston 2 by means of a force applied to the right hand free end thereof, for example, by a brake pedal (not shown). Such a displacement of the control plunger 3 occurs against the force of a spring arrangement 17 situated between the amplifier piston 2 and the control plunger 3. The spring arrangement 17 which may be a compression spring, urges the amplifier piston 2 and the control plunger 3 in the direction of outward separation so that the control plunger 3—in case no other forces act thereon—assumes its position shown in the FIGURE. For transmitting the force of the brake pedal, there is provided a pressure piston 18 which acts as a reaction piston and which is form-lockingly connected with the free end of the control plunger, for example, by means of a radially projecting fastening pin 19. The pressure piston 18 is axially displaceably supported in a closure plug 1a which outwardly seals the valve assembly housing 1.

The amplifier piston 2 is formed of a plurality of preferably rotationally symmetrical components which are affixed to one another. Thus, the amplifier piston 2 has an outer guiding sleeve 21a axially slidably supported in the cylindrical bore 9 of the valve assembly housing 1, an inner control sleeve 21b coaxially arranged within the outer sleeve 21a and affixed thereto by means of a snap ring 20 as well as a piston base member 22 which is press-fitted into the free end of the inner sleeve 21b and which radially closes off the left end thereof, whereby the axial blind bore 14 in the amplifier piston 2 is obtained. The outer mantel face of the outer guiding sleeve 21a has a circumferential annular groove which, together with inner face portions of the housing wall of the valve assembly housing 1 forms an outer annular pressure chamber 12 into which opens a pressure conduit 10 which is formed in the valve assembly housing 1 and which is, in a conventional manner not shown, connected to the hydraulic pressure source (also not shown) supplying the system pressure. The outer annular pressure chamber 12 is so arranged and dimensioned that it remains in continuous communication with the pressure conduit 10 irrespective of the axial position of the amplifier piston 2.

The outer left hand end of the inner sleeve 21b projecting from the outer guiding sleeve 21a, together with the press-fitted piston base member 22 and inner face portions of the wall of the valve assembly housing 1 define an annular clearance constituting a return chamber 13 into which opens a return conduit 11 formed in the valve assembly housing 1. The return conduit 11 is connected in a conventional manner with the low-pressure (non-pressurized) sump of the hydraulic fluid circuit. The pressure chamber 12 and the return chamber 13 are sealed with respect to one another as well as with respect to the valve assembly housing 1 by means of seals and by means of a separating piston 23. The separating piston 23 functions, on the one hand, as a seal axially bounding the return chamber 13 and, on the other hand, serves as a guide for an axial force-transmitting member 24 which is connected with the amplifier piston 2 and which serves, for example, for transmitting force, applied by the amplifier piston 2, to an after-connected master brake cylinder of a braking system.

Between the right hand end of the amplifier piston 2 and the closure plug 1a of the valve assembly housing 1 there is formed the work chamber 8 proper of the amplifier valve. The work chamber 8, dependent upon the relative position of the control plunger 3 with respect to the amplifier piston 2 is in hydraulic communication either with the pressure conduit 10 or with the return conduit 11 by means of control ports which are provided in the flow path of the hydraulic fluid between the work chamber 8 and the pressure chamber 12 or between the work chamber 8 and the return chamber 13. Thus, in the flow path which is effective between the work chamber 8 and the outer pressure chamber 12 there is provided a first control port 4 and in the flow path which is effective between the work chamber 8 and the return chamber 13 there is provided a second control port 7. The control ports 4 and 7 which are both provided in the amplifier piston 2, cooperate with the associated control edges of the control plunger 3. The first control edge 15 associated with the first control port 4 is part of a land of the control plunger 3, while the second control edge 16 is formed by the free left end face of the control plunger 3. In the illustrated position of the device the brake pedal is not actuated, and thus the first control port 4 is closed. Consequently, hydraulic communication between the pressure chamber 8 and the pressure conduit 10 is blocked. Upon actuation of the brake pedal, an axial force is exerted on the pressure piston 18, and, as a result, the control plunger 3 moves from its illustrated position of rest towards the left relative to the amplifier piston 2, whereby the first control port 4 opens. When the first control port 4 is open, there is a hydraulic communication between the pressure conduit 10 and the pressure chamber 8 by means of the outer annular pressure chamber 12 and the open first control port 4 and thus a free flow of the hydraulic fluid from the pressure source to the hydraulic work chamber 8 is ensured. It is noted that the amplifier piston 2 does not engage sealingly the closure plug 1a of the valve housing 1 with its right end face even in its illustrated position of rest and thus pressurized hydraulic liquid is allowed to pass into the work chamber 8 irrespective of the position of the amplifier piston 2, as long as the first control port 4 is open.

When the second control port 7 is open, there is obtained a hydraulic communication between the return conduit 11 and the work chamber 8 by means of the return chamber 13, the second control port 7, and an axial coupling bore 25 of the control plunger 3. In the relative position between the control plunger 3 and the amplifier piston 2 providing such a communication, the return of the hydraulic fluid from the work chamber 8 to the low-pressure sump is ensured.

The first plunger element, that is, the control plunger 3 and the second plunger element, that is, the amplifier piston 2 are manufactured as an unbalanced unit with a large-tolerance fit which permits a certain radial displacement of the control plunger 3 relative to the amplifier piston 2. The control ports 4 and 7 are therefore arranged in the amplifier piston 2 asymmetrically with respect to the circumference of the two plunger elements.

Both the first control port 4 and the second control port 7 are, in the illustrated embodiment, constituted by a respective control slot extending transversely to the longitudinal axis of the amplifier piston 2. It is feasible, however, to provide control ports of circular cross section; slots, however, have certain advantages from the point of view of control technology. Both control ports 4 and 7 in the amplifying piston 2 are situated on the same circumferential side, that is, in the zone of a common generatrix. In the embodiment illustrated, each control port is formed by a single slot. It is feasible, however, to provide closely arranged adjacent slots which cooperate with a corresponding number of control edges of the control plunger to thus increase the control cross section activated or deactivated by the displacement of the control plunger over a given time or displacement.

The control plunger 3 is arranged in the amplifier piston 2 without axial annular seals or the like, thus ensuring a particularly low-friction, easily movable arrangement. In order to achieve a highly efficient seal of the control ports in the closed state thereof for the purpose of avoiding leakages, there is provided a force-transmitting member which is exposed to the system pressure and which can displace the control plunger 3 mechanically in a positive manner in the radial direction such that the control plunger 3 is pressed against the inner wall of the amplifier piston 2 in the zone of the control ports 4 and 7. In case of a certain relative position of the control plunger 3 with respect to the amplifier piston 2, that is, when the control port under consideration is just closed, a very efficient and reliable seal is achieved by means of radially pressing the control plunger 3. The above-noted force-transmitting member comprises a radially displaceable transverse piston 5 which is arranged in the wall of the amplifier piston 2. By means of a transverse pin 6 which at its opposite ends has a hemispherical configuration and which engages the transverse piston 5 as well as the control piston 3, the transverse piston 5 is force-transmittingly connected with the control plunger 3. As seen in the FIGURE, the hemispherical contact in this embodiment allows a relative displacement (rocking motion) of the transverse pin 6 with respect to the control plunger 3 as relative axial shifts between the inner sleeve 21b and the control plunger 3 occur. The outer face of the transverse piston 5 is in continuous communication with the annular pressure chamber 12 of the amplifier piston 2, so that the transverse piston 5 exerts continuously a radially oriented force on the control plunger 3. The magnitude of the radially oriented force may be in a simple manner adapted to the requirements by an appropriate dimensioning of the effective surfaces.

In the illustrated embodiment, in which two control ports are shown, that is, a first control port for hydraulic fluid with relatively high pressure and a second control port for hydraulic fluid with relatively low pressure, the force-transmitting member 5, 6 is arranged in the generatrix zone diametrically opposite the control ports, between the two control ports 4 and 7 and is closer to the first control port 4. The slight axial offset of the force-transmitting member 5, 6 towards the first control port 4 provides that the control plunger 3, despite its loose fit in the amplifier piston 2, lightly engages the wall of the latter even in the zone of the second control port 7 so that the second control port 7, upon passage of pressurized fluid through the first control port 4, automatically closes and seals. While normally a single force-transmitting member 5, 6 suffices to ensure the required sealing effect, it is feasible to provide two or more such members.

In the inner wall of the control sleeve 21b of the amplifier piston 2 there is provided an annular groove 26 which is as close to the first control port 4 as possible and which is in a hydraulic communication with the work chamber 8. In this manner the pressure-effective surfaces in the zone of the first control port 4 are decreased. The forces which build up on these surfaces and which oppose the closing of the control port 4 are accordingly reduced so that the diameter of the transverse piston 5 can be reduced accordingly.

While the invention was described above in connection with an unbalanced hydraulic amplifier valve assembly, it is to be understood that the invention is not limited to such amplifier valves but may find application in all unbalanced hydraulic valve assemblies in which a first plunger element is arranged within a second plunger element for axial displacement and wherein by means of an asymmetrically arranged control port, dependent upon the relative position of the two plunger elements, the passage of hydraulic fluid from a pressure source supplying system pressure—for example, for forwarding into a hydraulic pressure chamber—is permitted or is blocked and wherein the first plunger element is arranged with an arbitrarily loose fit within the second plunger element and may be displaced radially to a certain extent.

It is noted that only those details and functional characteristics of the hydraulic valve assembly are described which are deemed necessary for understanding the invention. Structural and functional features pertaining to the amplifier proper are described, for example, in German Laid-Open Application (Offenlegungsschrift) No. 2,928,985.

It will be understood that the above description of the present invention is susceptible to various modifications, changes and adaptations, and the same are intended to be comprehended within the meaning and rahge of equivalents of the appended claims.

What is claimed is:

1. In an unbalanced hydraulic valve assembly including a first plunger element; a second plunger element having an axial bore receiving, with a loose fit, said first plunger element for axial and radial displacement relative to said second plunger element; a work chamber within said valve assembly; a pressure supply conduit provided in said valve assembly for introducing pressurized hydraulic fluid into said valve assembly; control port means in one of said plunger elements, said control port means being arranged asymmetrically relative to the circumference of said plunger elements; said control port means being arranged for permitting or blocking flow from said pressure supply conduit to said work chamber dependent upon the relative axial position of said plunger elements with respect to one another; the improvement comprising a force transmitting member supported in said second plunger element for displacement transversely to the direction of relative axial motion of said plunger elements and relative to said second plunger element, said force transmitting member engaging said first plunger element and having a surface, means for providing a continuous hydraulic communication between the pressure supply conduit and said surface for exposing said surface to the pressurized hydraulic fluid for pressing said first plunger element against an inner wall face of said axial bore provided in said second plunger element; and further wherein said first plunger element and said second plunger element being free from annular seals between said plunger elements.

2. An unbalanced hydraulic valve assembly as defined in claim 1, wherein said force transmitting member comprises a piston supported in said second plunger element for reciprocation perpendicularly to the direction of said relative axial motion and a pin extending perpendicularly to the direction of said relative axial motion; said pin having a first end engaging said piston and a second end engaging said first plunger element.

3. An unbalanced hydraulic valve assembly as defined in claim 2, wherein said first and second ends of said pin have a hemispherical configuration.

4. An unbalanced hydraulic valve assembly as defined in claim 2, further comprising means defining a pressure-releasing annular groove provided in said second plunger element and being in hydraulic communication with said work chamber.

5. An unbalanced hydraulic valve assembly as defined in claim 1, wherein said control port means comprise two axially spaced control ports in said second plunger element, further comprising means defining a pressure-releasing annular groove provided in said second plunger element and being in hydraulic communication with said work chamber.

6. An unbalanced hydraulic valve assembly as defined in claim 5, wherein said pressure-releasing annular groove is situated in the immediate vicinity of one of said control ports.

7. An unbalanced hydraulic valve assembly as defined in claim 1, further comprising a return conduit formed in said valve assembly for discharging hydraulic fluid from said valve assembly; further wherein said control port means comprises a first control port permitting or blocking the flow of hydraulic fluid from said pressure supply conduit to said work chamber dependent on the relative axial position of said first and second plunger elements and a second control port situated at an axial distance from said first control port; said second control port permitting or blocking the flow of hydraulic fluid from said work chamber to said return conduit dependent on the relative axial position of said first and second plunger elements; said first and second control ports being arranged asymmetrically with respect to said circumference and being located at least approximately in the zone of the same generatrix of said one of said plunger elements; said force transmitting member being situated between said first and second control ports at a location closer to said first control port than to said second control port; said force transmitting member being supported in said second plunger element at a location diametrically opposite said control ports.

8. An unbalanced hydraulic valve assembly as defined in claim 7, further comprising a valve assembly housing having an axial cylindrical bore; said pressure conduit and said return conduit opening into said axial bore at an axial distance from one another; said second plunger element being an amplifier piston axially displaceably received in said bore, said amplifier piston having an outer face provided with a circumferential annular groove defining, together with a face portion of said bore, an annular pressure chamber being in continuous communication with said pressure conduit; said amplifier piston defining, together with face portions of said bore, a return chamber being sealed from said pressure chamber and being in continuous communication with said return conduit; said amplifier piston having an axial bore; said first plunger element being a control plunger axially slidably received in the bore of said amplifier piston; said first and second control ports being provided in said amplifier piston; said first control port maintaining communication between said pressure chamber and said bore of said amplifier piston; said second control port maintaining communication between said return chamber and said bore of said amplifier piston; further comprising first and second control edges forming part of said control plunger and cooperating with said first and second control ports, respectively, for permitting or blocking flow of hydraulic fluid therethrough dependent upon the relative axial position of said amplifier piston and said control plunger.

9. An unbalanced hydraulic valve assembly as defined in claim 8, wherein said control ports are respective slots extending perpendicularly to the direction of relative axial displacement between said amplifier piston and said control plunger.

10. An unbalanced hydraulic valve assembly as defined in claim 8, wherein said control ports are respective bore holes.

11. An unbalanced hydraulic valve assembly as defined in claim 1, wherein said force transmitting member comprises a piston supported in said second plunger element for reciprocation perpendicularly to the direction of said relative axial motion, a connecting part coupling said piston with said first plunger element for transmitting forces from said piston to said first plunger element and means for allowing relative displacement between said connecting part and said first plunger element.

12. An unbalanced hydraulic valve assembly as defined in claim 1, wherein said work chamber surrounds said second plunger element and is in a continuous hydraulic communication with said pressure supply conduit and said surface; said work chamber forms said means providing a continuous hydraulic communication.

* * * * *